United States Patent [19]

Schopper

[11] 4,311,345
[45] Jan. 19, 1982

[54] TWO-CIRCUIT PRESSURE REGULATOR

[75] Inventor: Bernd Schopper, Frankfurt am Main, Fed. Rep. of Germany

[73] Assignee: ITT Industries, Inc., New York, N.Y.

[21] Appl. No.: 130,907

[22] Filed: Mar. 17, 1980

[30] Foreign Application Priority Data

Apr. 19, 1979 [DE] Fed. Rep. of Germany ....... 2915865

[51] Int. Cl.$^3$ .............................................. B60T 11/32
[52] U.S. Cl. .................................. 303/84 A; 303/6 C
[58] Field of Search .................... 303/6 R, 6 C, 84 A, 303/84 R

[56] References Cited

U.S. PATENT DOCUMENTS 3,482,884 12/1969 Kersting ........................ 303/84 A X
3,627,385 12/1971 Stokes .................................. 303/6 C
4,208,074 6/1980 Ishigami .............................. 303/6 C Primary Examiner—Duane A. Reger
Attorney, Agent, or Firm—John T. O'Halloran; Alfred Hill

[57] ABSTRACT

Known two-circuit pressure regulators with differential pressure warning indicators are very expensive with regard to production and unreliable with regard to operation. To eliminate these disadvantages, the two-circuit pressure regulator with a differential pressure warning indicator disclosed herein includes an annular leak indication piston having a bore therein that supports and guides the piston shafts of the two regulator valves. The annular piston is so designed that with approximately equal pressures in both brake circuits the annular piston independently assumes its usual central rest position.

14 Claims, 2 Drawing Figures

TWO-CIRCUIT PRESSURE REGULATOR

BACKGROUND OF THE INVENTION

The present invention relates to a two-circuit pressure regulator, the two circuits of which each have an inlet for connection to a pressure source, especially for connection to a different circuit of a tandem master brake cylinder of a motor vehicle, an outlet for connection to a pressure consumer, especially for connection to a different wheel brake cylinder of a motor vehicle, a pressure regulator valve connected between inlet and outlet loaded in the opening direction by a spring and which closes when a predetermined switching pressure is reached and with a further pressure increase in the inlet port influences the pressure in the outlet port according to a predetermined control action. The two regulator valves are separated from one another by a leak indication piston, slideably guided in a housing bore of the two-circuit pressure regulator and receiving on opposite end surface thereof the pressure in the inlet or outlet port of both circuits. The leak indication piston is axially shifted in one of the two circuits relative to the other of the two circuits when a pressure drop occurs in either of the two circuits and operates a leak indication switch.

Two-circuit pressure regulators of this type are especially used for motor vehicles and serve the purpose of controlling the braking force of individual wheels. Since the rear wheels in particular tend to lock easily during the braking process their braking force must be reduced or limited compared to the braking force of the front wheels. For this purpose each of the wheel brake cylinders of the rear wheels are connected to a different one of the outlets of the two-circuit pressure regulator and each of the inlets of the two-circuit pressure regulator is connected to a different one of the circuits of a tandem master brake cylinder. Each circuit of the tandem master cylinder is also connected to a different one of the wheel brake cylinders of the front wheels.

In the Great Britain Pat. No. 1,495,768 published Dec. 21, 1977, a two-circuit pressure regulator of the type mentioned above is described which works as a pressure reducing device. In this known two-circuit pressure regulator the valve springs of the non-return valves are arranged at the end surfaces of the indication piston, so that the leak indication piston can have, with equal pressure in both circuits, a stable position. Since, however, during operation unavoidable slight pressure differences occur in both circuits the leak indication piston is constantly pushed to and fro slightly so that the leak indication switch may be operated without a real leak existing and the springs of the non-return valves are unequally loaded. Furthermore, the construction and assembly of this known two-circuit pressure regulator are relatively expensive.

SUMMARY OF THE INVENTION

An object of the present invention is to provide a two-circuit pressure regulator with simple construction, the leak indication piston of which takes a stable position even with slight pressure differences that are unavoidable occur during operation, but which, however, is safely shifted when a leak occurs and automatically takes again its neutral position after the fault has been cleared.

A feature of the present invention is the provision of a two-circuit pressure regulator comprising; a housing having a first bore, therein coaxial of a longitudinal axis, the first bore having a first smaller diameter area adjacent one end of the housing and a second larger diameter area adjacent the other end of the housing; a first circuit including a first inlet disposed in the housing opening into the bore adjacent the one end of the housing, a first outlet disposed in the housing opening into the bore adjacent the one end of the housing spaced from the first inlet and a first pressure regulating valve having a first piston shaft coaxial of the axis extending toward the center of the first bore and a first valve body disposed between the first inlet and the first outlet, the first valve being biased in an opening direction, which closes when a first predetermined switching pressure occurs and which influences the pressure in the first outlet according to a predetermined control action when a further pressure increase occurs in the first inlet; a second circuit including a second inlet disposed in the housing opening into the bore adjacent the other end of the housing, a second outlet disposed in the housing opening into the bore adjacent the other end of the housing spaced from the second inlet, and a second pressure regulating valve having a second piston shaft coaxial of the axis extending toward the center of the first bore and a second valve body disposed between the second inlet and the second outlet, the first valve being biased in an opening direction which closes when a second predetermined switching pressure occurs and which influences the pressure in the second outlet according to a predetermined control action when a further pressure increase occurs in the second inlet; an annular leak indication piston disposed coaxially of the axis and slideably guided in the first bore having applied to one end, thereof the pressure at the first inlet and outlet and having applied to the other end thereof the pressure at the second inlet and outlet, the annular piston being axially shifted in one of the first and second circuits relative to the other of the circuits with a pressure drop in either of the first and second circuits to operate a leak indication switch lever, the annular piston having a first end piece with a first end surface of relative large area adjacent the first inlet and outlet slideably guided in the first area of the first bore, a second end piece with a second end surface have a smaller area than the first end surface adjacent the second inlet and outlet, and a second bore therein coaxial of the axis to slideably guide therein the first and second piston shafts; an annular push piston slideably guided on the outer surface of the second end piece and slideably guided in the second area of the first bore; and a stop step in the annular piston and a stop in the first bore adjacent the stop step limits the movement of the push piston toward the center of the first bore, whereby with substantially equal pressure in both of the first and second circuits the push piston is pressed against the stop by the pressure of the second circuit and the annular piston through the stop step is pressed against the end of the push piston remote from the second inlet and outlet by the pressure of the first circuit to place the annular piston at rest.

The stable position of the leak indication piston even when there are small pressure differences in the circuits is achieved according to this invention in that the large end surface of the annular piston having pressure in the first circuit applied thereto is smaller than the total of the end surfaces of the push piston and the annular piston having pressure in the second circuit applied thereto. As long as equal pressure prevails in both circuits, or there are only slight pressure differences, the push piston and the annular piston are shifted only until the push piston abuts against the stop in the housing bore with its end surface spaced from the second circuit. In this position the pressure exerted by the second circuit on the push piston is received by the housing of the two-circuit regulator. The pressure forces of the second circuit acting on the smaller front of the annular piston are alone not sufficient for further shifting of the annular piston against the pressure forces of the first circuit acting on the large end surface of the annular piston. The sensitivity to response can be brought to a value meeting practical requirements by appropriately choosing the relationship between the end surfaces of the annular piston and the push button. Also, below a predetermined pressure difference, the pressure forces of the first circuit acting on the larger end surface of the annular piston are not sufficient for shifting the annular piston and the push piston at the same time. Consequently, within a predetermined pressure difference between the two circuits, the annular piston has a stable position.

With the piston shafts of the pressure regulator valves guided in the longitudinal bore of the annular piston their results an advantageous, very space-saving arrangement.

Another feature of the present invention is the provision of additional stops in the housing bore that limits the shifting of the annular piston with a pressure drop in one circuit relative to the other circuit compared to its position with equal pressure in both circuits.

Still another feature of the present invention is the provision of a middle piece on the annular piston having a larger diameter than both end pieces with the middle piece being guided in an enlarged area of the housing bore having a greater length than the middle piece. With this arrangement the shifting of the annular piston occurring when there is a pressure drop in one circuit relative to the other circuit is advantageously limited since one edge of the middle piece of the annular piston bumps against a step in the housing bore.

A further feature of the present invention is the provision that the housing is separably at right angles to its longitudinal axis in the enlarged area of the housing bore and the annular piston is especially made of two pieces, one piece being guided in the push piston and the other piece being guided in the housing bore with abutting surface between the two pieces to transmit axial forces. This arrangement allows an especially simple assembly of the two-circuit pressure regulator of the present invention.

Still a further feature of the present invention is the provision of a common expanding spring, such as a helical compression spring, disposed in a hollow space of the annular piston to load both of the pressure regulator valves in the opening direction. With this arrangement the pressure regulator valves have exactly equal switching forces.

Another further feature of the present invention is the provision of two springs each loading a different one of the pressure regulating valves in the opening direction. Each of the two springs are disposed between a step in the housing bore and a stop secured to the associated one of the piston shafts of the pressure regulating valves. With this arrangement it is possible to provide pressure regulator valves with different switching forces, if the leak indication piston is actuated by the pressures at the inlet port of the circuits.

Still another further feature of the present invention is the provision that the pressure regulating valves are guided at their piston shafts in longitudinal bores of the annular piston. This makes it easy to combine the annular piston and the pressure regulator valves to provide a subassembly which then can be inserted into the housing bore of the two-circuit pressure regulator.

BRIEF DESCRIPTION OF THE DRAWING

Above mentioned and other features and objects of this invention will become more apparent by reference to the following description taken in conjunction with the accompanying drawing, in which.

DESCRIPTION OF THE PREFERRED EMBODIMENTS

Figure 1:
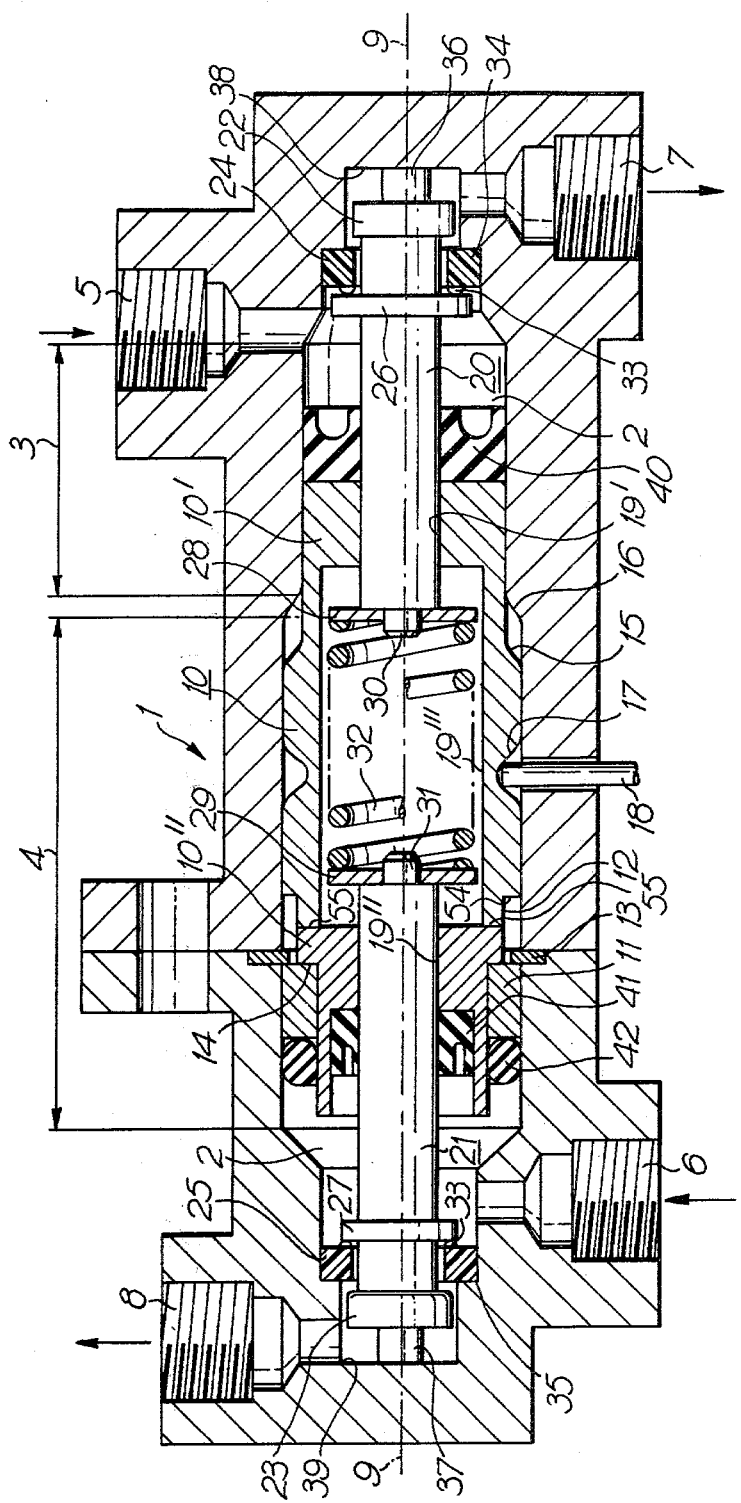
FIG. 1 is a longitudinal cross-sectional view of a first embodiment of a pressure regulator in accordance with the principles of the present invention in which the pressure regulator valves have a common spring arrangement.
Figure 2:
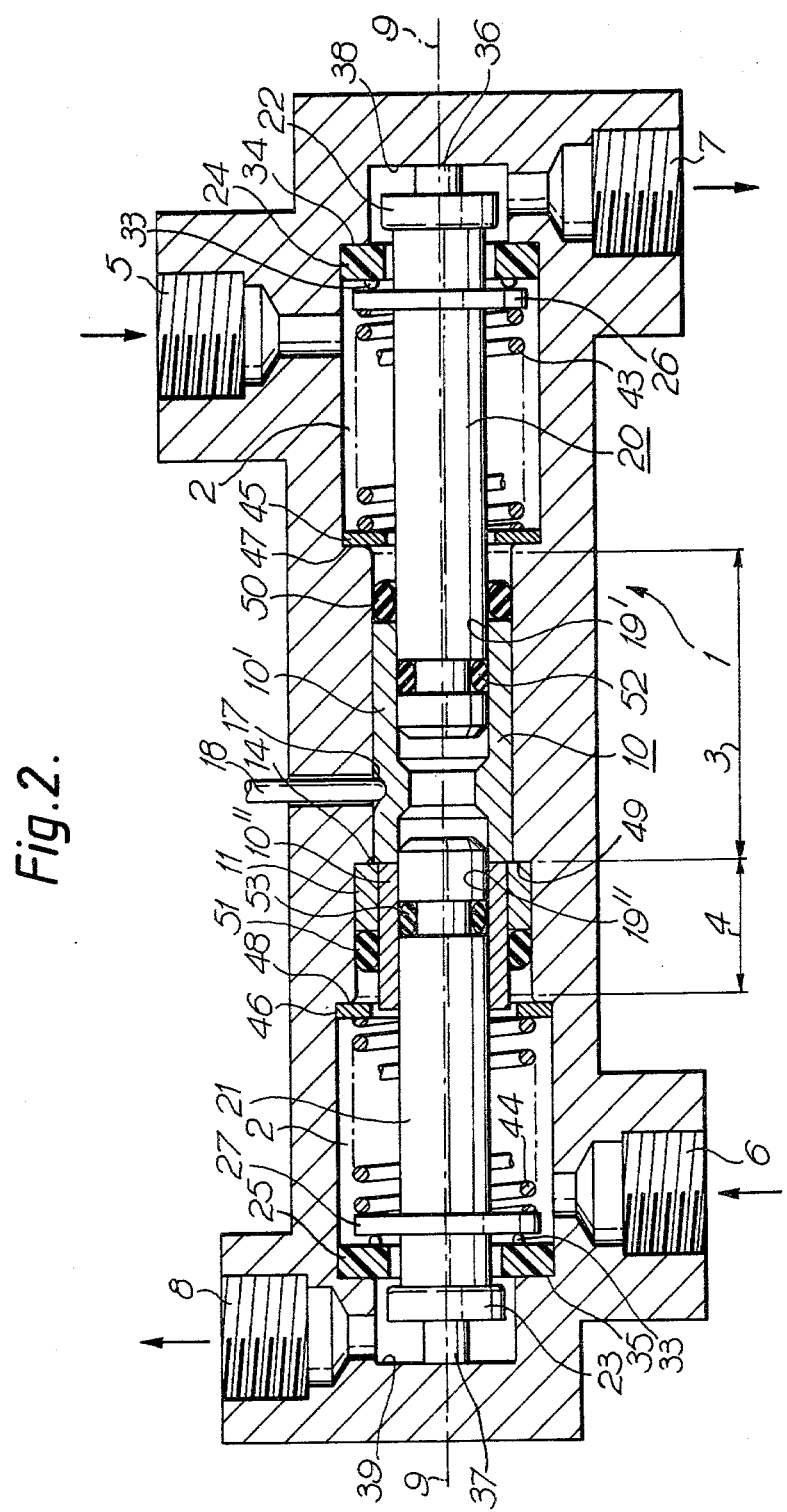
FIG. 2 is a longitudinal cross-sectional view of a second embodiment of a pressure regulator in accordance with the principles of the present invention in which the pressure regulator valves have separate spring arrangements.

Elements which correspond to one another have the same reference character applied thereto in both FIGS. 1 and 2.

Referring to FIG. 1, the two-circuit pressure regulator according to the present invention includes a cylinder-like housing 1 made of two parts with a stepped housing bore 2, which has a first area 3 with a smaller diameter and a second area 4 with a greater diameter. Housing bore 2 is in every part of housing designed as a stepped bore. Housing bore 2 is connected to a first inlet 5, a second inlet 6, a first outlet 7 and a second outlet 8. The inlets 5 and 6 and the outlets 7 and 8 are each laterally arranged at housing 1.

Inlets 5 and 6 each have an axial distance to outlets 7 and 8 along the axis 9—9 of housing 1.

Within housing bore 2 there is disposed an annular piston 10 made of two parts 10' and 10". Part of end piece 10' is a stepped annular piston having a smaller diameter portion guided in first area 3 of housing bore 2 and a larger diameter portion guided in the larger diameter second area 4 of housing bore 2. Part of end piece 10" is slideably guided in an annular push piston 11 which encircles this end piece. Push piston 11 for its part is slideably guided in the larger diameter second area 4 of housing bore 2.

End piece 10" of annular piston 10 has a shoulder 12 the diameter of which is greater than the inside diameter of push button 11 and smaller than the diameter of second area 4 of housing bore 2. Shoulder 12 abuts abutting surface 55 of end piece 10'.

Within second area 4 of housing bore 2 a stop ring 13 is inserted at the boundary of the two housing parts, which limits the shifting of push piston 11 to the right when viewing FIG. 1 and the shifting of end piece 10' of annular piston 10 to the left when viewing FIG. 1.

End piece 10' of annular piston 10 has a stop edge 54 facing stop ring 13 and a stop edge 15 which faces a step 16 of housing bore 2 between first area 3 and second area 4 of housing bore 2. The distance between stop edges 54 and 15 is smaller than the distance between stop ring 13 and step 16. Thus, end piece 10' of annular piston 10 is given a corresponding clearance of movement which corresponds to the necessary shifting of annular piston 10 in the case of a leak.

End piece 10' of anular piston 10 has an indentation 17 on its outer surface. A switch pin 18 of a leak indication switch (not shown) engages indentation 17. Switch pin 18 is laterally guided through the wall of housing 1. When end piece 10' of annular piston 10 is axially shifted switch pin 18 is slightly shifted out of the housing and thereby operates the leak indication switch which is not shown.

Annular piston 10 has in its end piece 10' an axial longitudinal bore 19' and in its end piece 10" an axial longitudinal bore 19". Longitudinal bores 19' and 19" have a common axis and have equal diameters.

Longitudinal bore 19' guides piston shaft 20 of a first pressure regulator valve and longitudinal bore guides piston shaft 21 of a second pressure regulator valve. Piston shafts 20 and 21 carry on one end thereof adjacent inlets 5 and 6 plate-shaped valve bodies 22 and 23, respectively, which cooperate, respectively, with the annular valve seats 24 and 25. These valve bodies 22 and 23 are held by piston shafts 20 and 21 between inlet 5 and outlet 7 and between inlet 6 and outlet 8, respectively, within housing bore 2 in such a way that there is a pressure medium passage between the associated inlet and outlet. Furthermore, shafts 20 and 21 carry rings 26 and 27, respectively, the outside diameter of which is greater than the inside diameter of valve seats 24 and 25 respectively. Rings 26 and 27 are disposed a given distance from valve bodies 22 and 23, respectively, between valve bodies 22 and 23 and longitudinal bores 19' and 19", respectively.

The other end of piston shafts 20 and 21 are disposed in an enlarged hollow space 19''' in piston end piece 10' and carry on this end plate discs 28 and 29, respectively, which are centered on pins 30 and 31 at the end of piston shafts 20 and 21, respectively. Between plate discs 28 and 29 a helical compression spring 32 is disposed which preloads plate discs 28 and 29 and, consequently, piston shafts 20 and 21 in opposite directions.

When the pressure regulator valves are closed, i.e. valve bodies 22 and 23 abut sealing rings 24 and 25, respectively, these sealing rings act as as non-return valves, that is, as soon as there is an overpressure in outlets 7 and 8 relatively to inlets 5 and 6, sealing rings 24 and 25 are shifted in the axial direction against rings 26 and 27, respectively, by the pressure in the outlet port, so that sealing rings 24 and 25 lift off valve bodies 22 and 23, respectively, and allow a pressure compensation. When piston shafts 20 and 21 and, thus, rings 26 and 27 are again shifted to the left in FIG. 1 by compression spring 32 sealing rings 24 and 25 are again shifted against steps 34 and 35, respectively, in housing bore 2.

A lip seal 40 seals piston shaft 20 to the smaller diameter first area 3 of housing bore 2. Another lip seal 41 is arranged in a bore in an end of end piece 10" of annular piston 10 and seals shaft 21 to this end piece 10". End piece 10" of annular piston 10 is sealed to the larger diameter second area 4 of housing bore 2 by a sealing ring 42.

The mode of operation of the two-circuit regulator is as following. The pressure of a pressure source, e.g. of a tandem master brake cylinder, reaches housing bore 2 via inlets 5 and 6 and from there reaches outlets 7 and 8.

When the pressure exceeds the switching pressure, which is predetermined by the strength of helical compression spring 32, valve bodies 22 and 23 are pressed against valve seats 24 and 25, respectively. Thereby inlets 5 and 6 are separated from outlets 7 and 8.

Since valve seats 24 and 25 have an internal diameter which is greater than the diameter of shafts 20 and 21 guided in longitudinal bore 19' and 19", respectively, the pressure regulator valves function as pressure reducing valves, so that valve bodies 22 and 23 are in an unstable equilibrium during the switching pressure. When the pressure in the inlet port further increases the pressure regulator valves move backwards and forwards in rapid succession, i.e. they open and close alternately. In doing so they operate according to the method of reducing valves, wherein the relation between the pressure in the inlet port and the pressure in the outlet port is dependent on the relation of the active areas of the pressure regulator valve.

If valve seats 24 and 25 have the same diameter as the end pieces of piston shafts 20 and 21 guided in longitudinal bore 19' and 19", respectively, the pressure regulator valves would operate as pressure limiting valve, i.e. they would remain closed even when the pressure in the inlet ports further increase as long as the switching pressure in the outlet ports continue to exist.

When the pressure in the inlet ports is reduced compared with the pressure in the outlet ports, a pressure compensation is effected via valve seats 24 and 25 designed as non-return valves. As soon as the pressure in the outlet port remains under the switching pressure the pressure regulator valves open again.

Should a pressure drop occur in one circuit of the two-circuit pressure regulator, annular piston 10 is shifted by the pressure in other circuit and, therey, switching pin 18 of the leak indication switch is operated. If the pressure drops between inlet 5 and outlet 7 the end piece 10' and 10" of annular piston 10 in FIG. 1 are shifted to the right until stop edge 15 of end piece 10' abuts against step 16 in housing bore 2. In this situation, as soon as there is again equal pressure, or just a slight pressure difference, in both circuits annular piston 10 is returned to its rest or central position by the pressure between inlet 5 and outlet 7 working against the pressure between inlet 6 and outlet 8.

If, however, the pressure between inlet 6 and outlet 8 drops, both end pieces 10' and 10" of annular piston 10 and push piston 11 in FIG. 1 are shifted to the left until stop edge 54 of end piece 10' of annular piston 10 abuts against stop ring 13. In this situation soon as there is again equal pressure, or just a slight pressure difference, in both circuits, push piston 11 and annular piston 10 are shifted to the right by the pressure between inlet 6 and outlet 8 working against the pressure between inlet 5 and outlet 7 until push piston 11 abuts against stop ring 13. A further shifting of end piece 10" of annular piston 10 is not possible since the pressure forces exerted by the pressure between inlet 6 and outlet 8 on end piece 10" are lower than the pressure forces exerted by the pressure between inlet 5 and outlet 7 on end piece 10" of annular piston 10.

Consequently, when there is equal pressure in both circuits, or there are slight variations in pressure, annular piston 10 and push piston 11 are in a stable position.

Embodiment according to FIG. 2 differs from the embodiment shown in FIG. 1 in that each of the pressure regulator valves are controlled by a different one of the helical pressure springs 43 and 44. Spring 43 is disposed between ring 26 secured to piston shaft 20 and supporting ring 45 disposed at step 47 in housing bore 2 and spring 44 is disposed between ring 27 secured to piston shaft 21 and supporting ring 46 disposed at step 48 in housing bore 2. Housing bore 2 has, just as in FIG. 1, a first smaller diameter area 3 and a second larger diameter area 4. Between these two areas housing bore 2 has a step 49. End piece 10' of annular piston 10 is slideably guided in first area 3 and push piston 11 is slieably guided in second area 4. Push piston 11 slideably encloses end piece 10'' of annular piston 10. End piece 10'' has an external diameter which is smaller than the diameter of first area 3 of housing bore 2 so that end piece 10'' as well as push piston 11 can abut against the adjacent end of end piece 10' of annular piston 10. An annular constriction is provided in the middle bore 19', 19'' of annular piston 10.

Shaft 20 is sealed to housing bore 10 by a seal 50 and end piece 10'' is sealed to housing bore 10 by a seal 51. Shafts 20 and 21 have at their ends within longitudinal bore 19', 19'' annular piston 10 the seals 52 and 53, respectively, which seal shafts 20 and 21 to annular piston 10.

The two-circuit pressure regulator of FIG. 2 operates in the same way as the one described in FIG. 1. This especially applies to annular piston 10 for the leak indication and push piston 11. When there is equal pressure, or when there are only slight difference in pressure, in both circuits push piston 11 and end piece 10'' of annular piston 10 are shifted to the right so that push piston 11 abuts step 49, a further shifting of end piece 10' is prevented by the counteracting end piece 10' of annular piston 10. In case of pressure drop between inlet 5 and outlet 7 end piece 10'' shifts the other end piece 10' of annular piston 10 until the constriction of bore 19', 19'' in annular piston 10 abuts piston shaft 20. This constriction serves as stop in this embodiment. If, however, the pressure between inlet 6 and outlet 8 drops, end piece 10' of annular piston 10 shifts the other end piece 10'' and push piston 11 until the constriction of bore 19', 19'' in annular piston 10 abuts piston shaft 21. As soon as equal pressure prevails again in both circuits end pieces 10' and 10'' and push piston 11 including seals 50 and 51 return to their stable position shown.

While I have described above the principles of my invention in connection with specific apparatus it is to be clearly understood that this description is made only by way of example and not as a limitation to the scope of my invention as set forth in the objects thereof and in the accompanying claims.

I claim:

1. A two-circuit pressure regulator comprising:
   a housing having a first bore therein coaxial of a longitudinal axis, said first bore having a first smaller diameter area adjacent one end of said housing and a second larger diameter area adjacent the other end of said housing;
   a first circuit including
   a first inlet disposed in said housing opening into said bore adjacent said one end of said housing,
   a first outlet disposed in said housing opening into said bore adjacent said one end of said housing space and from said first inlet, and
   a first pressure regulating valve having a first piston shaft coaxial of said axis extending toward the center of said first bore and a first valve body disposed between said first inlet and said first outlet, said first valve being biased in an opening direction, which closes when a first predetermined switching pressure occurs and which influences the pressure in said first outlet according to a predetermined control action when a further pressure increase occurs in said first inlet;
   a second circuit including
   a second inlet disposed in said housing opening into said bore adjacent said other end of said housing,
   a second outlet disposed in said housing opening into said bore adjacent said other end of said housing spaced from said second inlet, and
   a second pressure regulating valve having a second piston shaft coaxial of said axis extending toward the center of said first bore and a second valve body disposed between said second inlet and said second outlet, said first valve being biased in an opening direction which closes when a second predetermined switching pressure occurs and which influences the pressure in said second outlet according to a predetermined control action when a further pressure increase occurs in said second inlet;
   an annular leak indication piston disposed coaxially of said axis and slideably guided in said first bore having applied to one end thereof the pressure at said first inlet and outlet and having applied to the other end thereof the pressure at said second inlet and outlet said annular piston being axially shifted in one of said first and second circuits relative to the other of said circuits with a pressure drop in either of said first and second circuits to operate a leak indication switch lever, said annular piston having a first end piece with a first end surface of relative large area adjacent said first inlet and outlet slideably guided in said first area of said bore, a second end piece with a second end surface having a smaller area than said first end surface adjacent said second inlet and outlet, and a second bore therein coaxial of said axis to slideably guide therein said first and second piston shafts;
   an annular push piston slideably guided on the outer surface of said second end piece and slideably guided in said second area of said first bore; and
   a stop step in said annular piston and a stop in said first bore adjacent said stop step to limit the movement of said push piston toward the center of said first bore, whereby with substantially equal pressure in both of said first and second circuits said push piston is pressed against said stop by the pressure of said second circuit and said annular piston through said stop step is pressed against the end of said push piston remote from said second inlet and outlet by the pressure of said first circuit to place said annular piston at rest.

2. A regulator according claim 1, further including at least one additional stop disposed in said first bore adjacent said first inlet and outlet to limit the shifting of said annular piston when a pressure drop occurs in one of said first and second circuits relative to the pressure in the other of said first and second circuits.

3. A regulator according to claims 1 or 2, wherein said first end piece has a portion thereof with an enlarged diameter slideably guided in said second area of said first bore, said second area of said first bore having a length greater than the length of said enlarged diameter portion of said first end piece.

4. A regulator according to claim 3, wherein said housing in said second area of said bore is separable at right angles to said axis.

5. A regulator according to claims 1 or 2, wherein
said first and second end pieces abut each other to enable transmitting axial forces one to the other.

6. A regulator according to claims 1 or 2, further including
a spring common to said first and second piston shafts disposed in an enlarged diameter portion of said second bore to bias said first and second valves in said opening direction and to render said first and second predetermined switching pressures equal.

7. A regulator according to claim 6, wherein
said spring is a helical compression spring.

8. A regulator according to claim 7, wherein
said helical spring is disposed between two plates each secured to an end of a different one of said first and second piston shafts remote from an associated one of said first and second valve bodies.

9. A regulator according to claim 6, wherein
said spring is disposed between two plates each secured to an end of a different one of said first and second piston shafts remote from an associated one of said first and second valve bodies.

10. A regulator according to claim 1, further including
a first spring disposed between a first ring secured to said first piston shaft and a second ring abutting a first step in said first bore adjacent said first end surface to bias said first valve in said opening direction; and
a second spring disposed between a third ring secured to said second piston shaft and a fourth ring abutting a second step in said first bore adjacent said second end surface to bias said second valve in said opening direction.

11. A regulator according to claim 10, wherein
said first and second springs each have identical force transmitting characteristics to render said first and second switching pressures equal.

12. A regulator according to claim 10, wherein
said first and second springs each have different force transmitting characteristics to render said first and second switching pressures different.

13. A regulator according to claim 10, further including
a constriction in the central area of said second bore to limit the shifting of said annular piston when a pressure drop occurs in one of said first and second circuits relative to the pressure in the other of said first and second circuits.

14. A regulator according to claim 1, further including
a constriction in the central area of said second bore to limit the shifting of said annular piston when a pressure drop occurs in one of said first and second circuits relative to the pressure in the other of said first and second circuits.

* * * * *